United States Patent [19]

Gelhard

[11] 4,428,705
[45] Jan. 31, 1984

[54] SPREADING DOWEL FOR SECURING AN INSERT IN A PANEL WITH THE AID OF THE DOWEL

[75] Inventor: Manfred Gelhard, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 317,141

[22] Filed: Nov. 2, 1981

[30] Foreign Application Priority Data

Nov. 11, 1980 [DE] Fed. Rep. of Germany ....... 3042432

[51] Int. Cl.³ ............................................. F16B 13/04
[52] U.S. Cl. ........................................ 411/82; 29/460; 29/522 R; 411/103
[58] Field of Search .............. 29/460, 522 R; 411/58, 411/57, 82, 103, 105, 171, 174, 175, 176

[56] References Cited

U.S. PATENT DOCUMENTS

| | | | |
|---|---|---|---|
| 1,619,569 | 3/1927 | Dedouch | 411/57 |
| 1,788,612 | 1/1931 | Benson | 411/57 X |
| 1,979,686 | 11/1934 | Hall et al. | 411/58 |
| 3,216,305 | 11/1965 | Kaplan et al. | 411/58 |
| 3,451,181 | 6/1969 | Neuschotz | 411/176 X |
| 3,485,282 | 12/1969 | Lopez et al. | 411/82 |
| 3,579,942 | 5/1971 | Cole | 411/57 X |
| 3,621,557 | 11/1971 | Cushman et al. | 411/176 X |
| 3,651,563 | 3/1972 | Valkmann | 411/176 X |
| 3,716,092 | 2/1973 | Serewicz | 411/82 |
| 4,259,890 | 4/1981 | Walsh | 411/57 |
| 4,341,053 | 7/1982 | Dettfurth et al. | 411/82 |

FOREIGN PATENT DOCUMENTS

| | | | |
|---|---|---|---|
| 346785 | 7/1960 | Switzerland | 411/58 |
| 335508 | 9/1930 | United Kingdom | 411/57 |

*Primary Examiner*—Charlie T. Moon
*Attorney, Agent, or Firm*—W. G. Fasse; D. H. Kane, Jr.

[57] ABSTRACT

A metal insert, especially a threaded insert, is secured in a lightweight, sandwich type panel with the aid of a spreading dowel. First, a hole is machined, for example drilled, through one cover and through the core of the panel down to, but not through, the other cover. Then a spreading dowel is inserted into the hole so that it rests on the other cover. Then the metal insert is pressed into the spreading dowel, whereby the spreading wing elements are spread substantially radially outwardly until the outwardly facing surface of the insert is flush with the outer surface of the panel cover. In the last step the voids are filled with a hardening or curing synthetic resin bonding material. The spreading dowel has a leg base and spreading wings hinged to the base. A cam surface on each wing assures that the force resulting from pressing an insert into the dowel spreads the wings until the insert rests on a shoulder of each wing.

6 Claims, 6 Drawing Figures

SPREADING DOWEL FOR SECURING AN INSERT IN A PANEL WITH THE AID OF THE DOWEL

CROSS-REFERENCE TO RELATED APPLICATION

The present application is based on the corresponding German Patent Application P 30 42 432.9, filed in the Federal Republic of Germany on Nov. 11, 1980. The priority of the German filing date is hereby claimed for the present application.

BACKGROUND OF THE INVENTION

The present invention relates to a device including a spreadable dowel for securing a fastener insert, particularly a threaded fastener insert, into a panel, particularly a sandwich type panel having a core, for example a honeycomb core between two cover layers. The present invention also relates to a spreading dowel specifically constructed for use in such a device.

German Patent Publication (DE-OS) 2,061,347 discloses a sandwich type lightweight structural panel with a core between two covering layers into which a dowel is inserted into a bore. The dowel is provided with spreading elements for receiving and anchoring a threaded insert. In this prior art the threaded insert is first introduced into the bore and thereafter a sleeve is inserted into the bore. Thereafter, a threaded mandrel is inserted through the sleeve and threaded into the threaded insert. Thereafter, the threaded mandrel is pulled axially outwardly, whereby the threaded insert is pulled into the sleeve with a frictional contact. As a result of this pulling operation a throat in the sleeve is widened to form a bulging auxiliary head which cooperates with a main head of the sleeve in clamping the upper covering layer of the lightweight structural panel. Additionally, due to the pulling action and due to a spreading effect of the threaded insert, anchoring rods provided in the sleeve are caused to spread and thereby pressed into the core of the panel. A further anchoring is provided by a milled or knurled edge of the threaded insert which bites into the sleeve wall.

It is a substantial disadvantage of this type of prior art method that it is necessary to pull the threaded insert into the sleeve. This operation requires a special tool including a threaded mandrel which must be first threaded into the threaded insert and which after the pulling operation is completed must be threaded out of the threaded insert. Additionally, the pulling operation must be performed by a fluid operated piston cylinder arrangement, the piston of which is secured to one end of the threaded mandrel. Thus, the tool which itself is not of simple construction, depends on a hydraulic power supply.

Furthermore, after completion of the pulling operation a void or hollow space results below the threaded insert whereby the sandwich panel is weakened at that point. Thus, it has been found that the sandwich panels that may be used according to the prior art cannot be of too light a structure. For example, the core may not be of the so-called honeycomb type because the anchoring as disclosed in this prior art cannot be accomplished in a satisfactory manner in a honeycomb type panel with the aid of the prior art dowel in the form of a sleeve. Thus, the prior art method is primarily limited to a compound layer panel having a core of intermediate density such as a synthetic foam material core.

OBJECTS OF THE INVENTION

In view of the above it is the aim of the invention to achieve the following objects singly or in combination:

to provide a method of the type described above which makes it possible to securely anchor a threaded insert also in lightweight honeycomb type core sandwich panels;

to accomplish the anchoring by means of simple tools not requiring a threading and unthreading operation;

to avoid any empty spaces in the zone where the metal insert is anchored in the panel; and to provide an anchoring dowel which is especially constructed for carrying out the present method.

SUMMARY OF THE INVENTION

According to the invention the present method is carried out by first machining, for example, drilling a hole into the sandwich type panel through one cover layer and through the core down to the other cover layer, but not through the other cover layer. Then a spreading dowel is inserted into the hole so that the dowel rests with one end on the inner surface of the other cover layer and with the spreading elements or wings reaching toward the open end of the hole or bore. Thereafter the threaded insert is pressed into the dowel between the spreading wings, whereby the latter move radially outwardly into the core material. In the last step any remaining voids are filled with a curable or hardenable synthetic resin bonding material.

According to the invention there is also provided a spreading dowel which is characterized by a support portion having legs for resting on the inner surface of the other cover layer and an upper slotted portion forming separate spreading elements which are hinged to the support portion for insertion of the threaded insert.

As compared to the above described prior art, the invention has the advantage that the spreading dowel is inserted into the panel into a precisely defined position because the support legs rest on the bottom of the bore, that is, on the inwardly facing surface of the cover layer which is not penetrated by the bore. Further, the threaded insert may be inserted with a simple pressing tool by pushing it between the spreading elements or wings of the spreading dowel and such pressing operation results in the required anchoring. Furthermore, the spreading dowel and the threaded insert are interconnected with each other in a precisely defined position due to the shape of the spreading wings and due to the curing and bonding of the synthetic resin bonding material which fills all the voids in the dowel and around the threaded insert. The penetration of the threaded hole of the insert by the bonding material may, for example, be avoided by simply closing the inwardly facing end of the threaded hole of the insert, for example, by a sheet of paper.

BREIF FIGURE DESCRIPTION

In order that the invention may be clearly understood, it will now be described, by way of example, with reference to the accompanying drawings, wherein.

Figure 1:
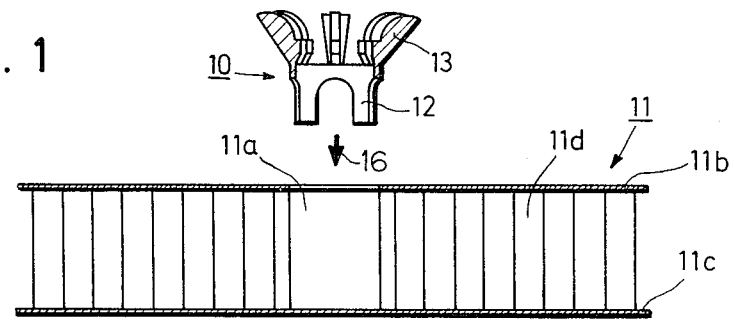
FIG. 1 is a sectional side view through a portion of a sandwich type structural panel and through the spreading dowel prior to its insertion into the panel.

DETAILED DESCRIPTION OF PREFERRED EXAMPLE EMBODIMENTS AND OF THE BEST MODE OF THE INVENTION:

FIG. 1 shows a portion of a lightweight sandwich type structural panel 11 into which a spreading dowel 10 is to be inserted. For this purpose a hole 11a is drilled through one cover layer 11b and through the core 11d, but not through the other cover layer 11c. A high speed drill bit or a milling cutter may be used for this purpose.

Figure 2:
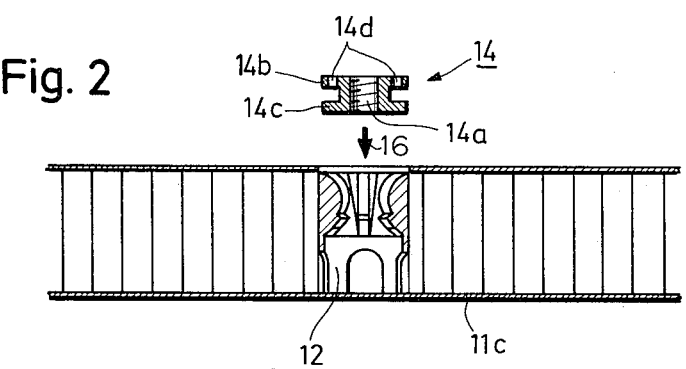
FIG. 2 is a view similar to that of FIG. 1, but showing the spreading dowel already inserted into the panel and further showing the threaded insert just prior to its insertion into the spreading dowel.

As shown in FIG. 2 after completion of the hole 11a, the spreading dowel 10 is inserted into the hole 11a so that the support portion 12 enters the hole 11a first in the direction of the arrow 16. The spreading dowel 10 is pushed into the hole 11a until the legs of the dowel contact the inwardly facing surface of the other cover layer 11c which has not been penetrated when making the hole 11a. The spreading dowel 10 has spreading wing elements 13 hingeably secured to the support portion 12 so that these spreading wing elements may initially swing radially inwardly as shown in FIG. 2. In this position the diameter of the entire spreading dowel 10 is the same along its entire length as the outer diameter of the support portion 12. The vertical length of the spreader dowel 10 is adaptable to the standardized thickness of the sandwich panel 11 as will be described in more detail below with reference to FIG. 5.

Figure 3:
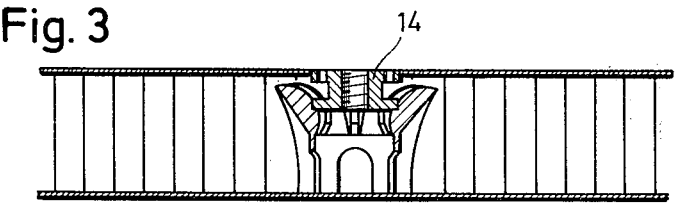
FIG. 3 is a view similar to that of FIGS. 1 and 2, but showing the dowel already spread by the inserted threaded metal insert.

FIG. 2 further shows a metal insert 14 having a threaded hole 14a and anchoring flanges 14b and 14c as well as filler holes 14d. The insert 14 is also moved in the direction of the arrow 16 against cam surfaces of the spreader dowel 10 into the position shown in FIG. 3 in which the top surface of the insert 14 takes up a position flush with the outer surface of the cover layer 11b. In this position of the insert 14 the spreader wings have been spread out radially outwardly as shown in FIG. 3.

Figure 4:
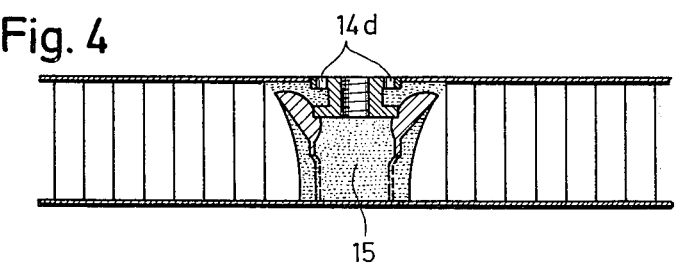
FIG. 4 shows the completed anchoring after the voids in the spreading dowel and around the threaded metal insert have been filled with a synthetic resin bonding material.

In the last step of the present method as shown in FIG. 4, a curing or hardening synthetic resin bonding material 15 is introduced through the filler holes 11d of the insert 14. The filler material 15 also fills the spaces between the flanges of the insert 14, whereby the latter is securely anchored in position after the curing of the bonding material such as an epoxy-resin.

The threaded bolt or screw for cooperation with the threaded hole 14a is not shown since it is not part of the invention. Further, at least two filler holes 14d will be provided for an efficient filling operation. The bonding material 15 fills all voids within the hole 11a and around the support portion 12 as well as around the spreading wings 13 and around the insert 14. Thus, after the curing or hardening, no loss of strength is encountered in a connecting structure according to the invention.

Further, due to the spreading wings 13 in combination with the hardening of the bonding or adhesive material 15 and due to the flange 14c, a relatively high rip-out strength has been found to exist in a structure as disclosed herein. Furthermore, as will be seen from FIG. 4, the bonding material 15 provides a direct connection between the inner surfaces of the cover layers 11b and 11c. It has been found that this feature of the invention results in a high strength relative to shearing loads.

Figure 5:
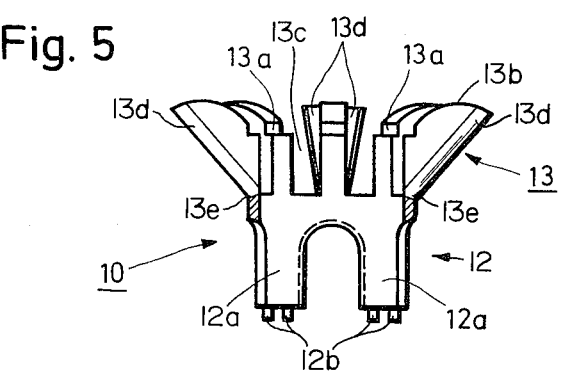
FIG. 5 is a side view partially broken away of a spreading dowel according to the invention.
Figure 6:
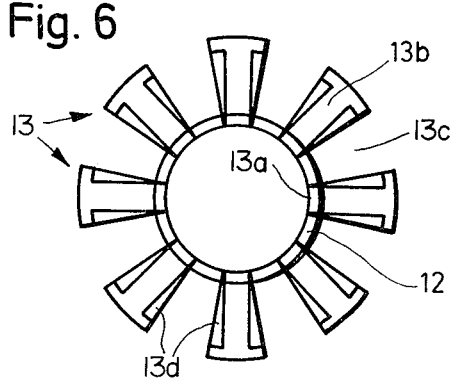
FIG. 6 is a top plan view onto a dowel as shown in FIG. 5.

Referring to FIGS. 5 and 6 the spreader dowel according to the invention will now be described in more detail. FIG. 5 shows a side view partially broken away, of the spreader dowel 10 according to the invention. FIG. 6 shows a top plan view of a complete spreader dowel 10 with the spreading wings 13 shown in the spread-out position corresponding to FIGS. 3 and 4. Each spreading wing 13 comprises a shoulder 13a, one surface of which takes up a horizontal position when the wing elements 13 are spread out so that the lower flange 14c may securely rest, or even snap in place on these shoulder 13a. Further, each wing 13 is provided with a cam surface 13b on which the edge of the lower flange 14c glides downwardly thereby pressing the wings simultaneously radially outwardly. Slots 13c are provided between adjacent wings 13, each of which has laterally extending reinforcing ribs 13d which simultaneously help to guide the bonding material 15 into the inner space of the spreading dowel 10. Thus, in addition to the reinforcing function, the ribs 13d also operate in the manner of a funnel. Below the shoulders 13a the spreading wings 13 are hinged to the support portion 12 by hinging zones 13e which are sufficiently flexible, for example, by providing a reduced cross-sectional area in the hinging zone 13e so that the wings 13 may take up the position shown in FIG. 2 or the position shown in FIGS. 3 and 4, as well as 5.

The legs 12a of the spreading dowel are provided with feet 12b which determine the total vertical height of the dowel 10. Thus, by providing these feet 12b with easily removable portions, it is possible to use one standard dowel for a plurality of standard thickness panels 11 by removing feet portions.

Although the invention has been described with reference to specific example embodiments, it will be appreciated, that it is intended to cover all modifications and equivalents within the scope of the appended claims.

What is claimed is:

1. In a device for securing fastener means having a central longitudinal axis in a hole of a sandwich type panel having two parallel outer surfaces, wherein the device includes a first component having spreadable elements and a second component having an inner threading, said second component spreading the spreadable elements of said first component when the second component is pressed into the first component, the improvement wherein said first component comprises a lower portion (12) to be inserted first into the hole of a sandwich type panel and an upper portion (13) comprising a plurality of said spreadable elements separated by slots, hinging means (13e) flexibly hinging said spreadable elements to said lower portion so that said spreadable elements extend somewhat radially outwardly relative to said central longitudinal axis prior to insertion into said hole, said hinging means being sufficiently yielding so that the spreadable elements are moved radially inwardly during insertion into said hole, said second component (14) comprising an insert with an internal threading having an upper flange (14b) and a lower flange (14c) extending substantially in parallel to said upper flange, said lower flange of said insert contacting said spreadable elements for spreading the spreadable elements radially outwardly inside said hole when said second component is pressed into said hole with the lower flange of the second component pressing said spreadable elements radially outwardly inside the panel until an outer surface of said upper flange of the second component extends substantially level with the adjacent outer panel surface.

2. The device of claim 1, wherein the upper flange of said threaded insert comprises openings (14d) for filling a curable bonding material through said openings into a hole in a panel.

3. The device of claim 1, wherein each spreadable element comprises an axially facing radially inwardly located shoulder (13a) providing a stop for said lower flange of said insert.

4. The device of claim 3, wherein each spreadable element comprises a curved cam surface (13b) facing radially inwardly and partially axially upwardly for cooperation with said lower flange of said insert, said shoulder (13a) being located at the inner end of the respective cam surface (13b) in such a position that an axially outwardly facing shoulder surface extends substantially horizontally when the respective spreadable element is in its fully spread out position with the lower flange of said insert resting against said shoulders of all spreadable elements.

5. The device of claim 1, wherein said hinging means comprise a reduced cross-sectional area hinging zone (13e) between each spreadable element and the lower portion of said first component.

6. The device of claim 1, wherein each spreadable element comprises a curved cam surface (13b) facing radially inwardly and partially axially upwardly for cooperation with said lower flange of said insert, whereby the lower flange rides down along said curved cam surfaces when said insert is pressed axially into said hole.

* * * * *